Nov. 14, 1967  J. L. GARTIN ETAL  3,352,405
CARTON TRANSPORTING MECHANISM
Filed July 8, 1966  7 Sheets-Sheet 1

INVENTORS
JOHN L. GARTIN
ROBERT K. GELLATLY
BY Francis W. Anderson ATTORNEY INVENTORS
JOHN L. GARTIN
ROBERT K. GELLATLY
BY Francis W. Anderson ATTORNEY 3,352,405
CARTON TRANSPORTING MECHANISM
John L. Gartin, San Jose, and Robert K. Gellatly, Santa Clara, Calif., assignors to FMC Corporation, San Jose, Calif., a corporation of Delaware
Filed July 8, 1966, Ser. No. 563,776
10 Claims. (Cl. 198—131)

ABSTRACT OF THE DISCLOSURE

A carton transporting mechanism which includes a continuously driven endless conveyor having carriers thereon. Each carrier having a pair of vertical walls disposed at right angles and having an angled corner abutment on one edge of one wall. A gate pivotally mounted on the carrier in a position opposing said one wall and being selectively held in an open position or a closed position by resilient means which clamps one end of the carton with sufficient force to square the other end of the carton.

---

The present invention pertains to carton forming and filling machines and more particularly relates to a carton transporting mechanism arranged to firmly grip a carton and to maintain the side walls thereof in a square condition.

The carton transporting mechanism of the present invention includes carriers which are intended for use in a carton forming and filling machine of the type disclosed in the copending application of Vadas et al., Ser. No. 461,738, which application was filed on June 7, 1965 and is assigned to the assignee of the present invention. The carton transporting mechanism of the present invention is also disclosed in the following applications filed on even date herewith and assigned to the assignee of the present invention: Stevenson et al., Ser. No. 563,875; Gartin, Ser. No. 563,860; and Cimlov, Ser. No. 563,736.

In the above mentioned carton forming and filling machine, flat-folded carton blanks are first unfolded into a generally square tubular form and thereafter have their bottom closures sealed to define vertically elongated cartons which may be quart, pint, one-third or one-half pint size cartons. The cartons with their top closures open are then transferred into carriers on a continuously driven conveyor and are moved past a plurality of operating stations wherein the top closures are preformed, the cartons are filled, and the top closures are subsequently sealed.

Since the cartons are formed from flat-folded blanks and since the walls of the cartons are somewhat resilient, the top closures of each carton tends to return to the flat-folded condition when unsupported thus deflecting the top closure from the desired square, or rectangular condition to that of a diamond-shaped condition.

In order to reliably preform, fill and seal the top closure of each carton, it has been discovered that it is necessary to positively grip each carton in its carrier and also to square the upper end, or top closure on the carton.

When moving the carriers through the filling section of the machine, it is also necessary to provide means for readily indicating whether or not each carrier has a carton therein so that liquid will be discharged only when a carton is clamped in a carrier in position to receive the liquid.

It is therefore, an object of the present invention to provide a carton transporting mechanism that includes a carrier which positively clamps the carton therein and also squares the top closure of the carton.

Another object is to provide a carton carrier which engages only the lower portion of a carton for clamping the carton in the carrier and for squaring the upper end of the carton.

Another object is to provide a carton carrier having a pivotal gate which is selectively positioned and resiliently held in an open carton receiving position, a closed carton gripping and squaring position, and an empty carton position.

Another object is to provide a carton carrier having a pivotal gate thereon capable of indicating whether or not a carton is positioned in the carrier.

These and other objects and advantages of the present invention will become apparent from the following description and the accompanying drawings, in which:

Figure 1:
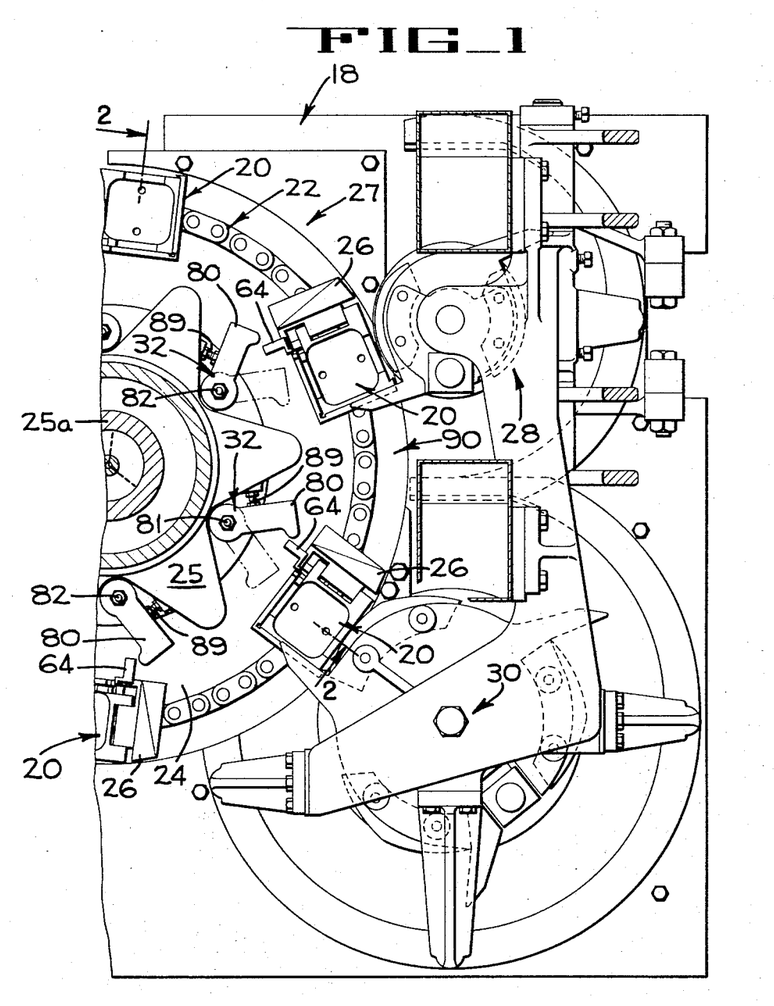
FIGURE 1 is a plan, with certain parts in section, of the carton transfer mechanism of the present invention and illustrating the carriers and the portion of the carton forming and filling machine that is arranged to transfer cartons into the carriers and then close the carriers.
Figure 2:
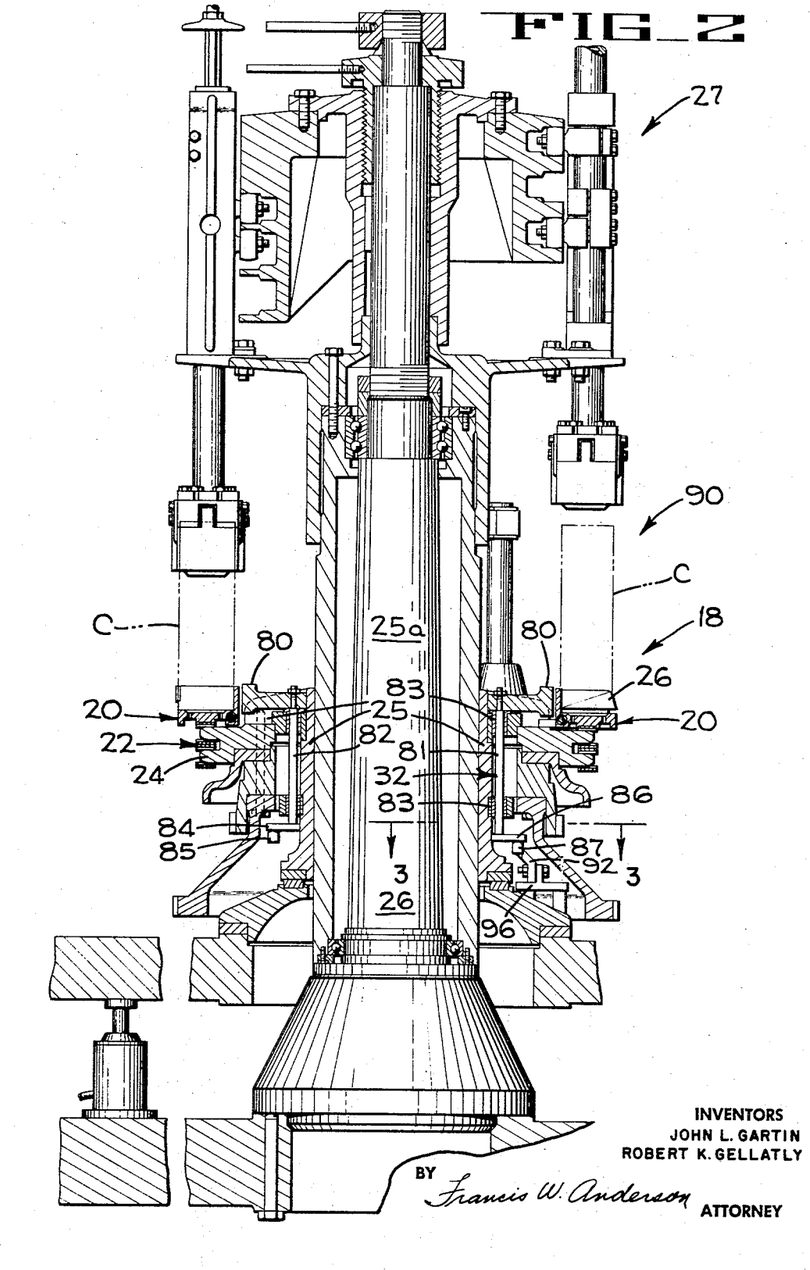
FIGURE 2 is a horizontal section taken substantially along lines 2—2 of FIGURE 1 illustrating the mechanism for closing the carrier gates.

In general, the carton forming and filling machine includes a carton transporting mechanism 18 (FIGS. 1, 2 and 5) of the present invention, which mechanism includes a plurality of carriers 20 that are mounted at equally spaced intervals along a continuously driven endless transport conveyor 22. The conveyar 22 is trained around a plurality of sprockets including a sprocket 24 that is bolted to a drive hub 25 (FIG. 2) mounted for rotation about a stationary post 25a of a top forming turret 27. As the conveyor 22 moves around the sprocket 24, the carriers 20 with their pivotal gates 26 open move into positions to receive cartons C from transfer turrets 28 and 30. The carrier gates 26 are then closed by a gate closing mechanism 32 which mechanism is associated with the turret 27. While supported in the carriers, the top closures of the cartons are preformed, the cartons are filled, and the top closures of the cartons are then sealed. The carrier gates 26 are then opened and the cartons are discharged from the carriers by means of a carton discharging mechanism 33 (FIG. 12) of the transporting mechanism 18 onto a discharge conveyor 34.

Each carrier 20 (FIGS. 5–11) comprises a main body 44 having a pair of chain attachment pins (not shown) welded thereto and projecting downwardly therefrom for pivotal acceptance by the chain of the conveyor 22. The body 44 includes a rear upstanding wall 48, a side upstanding wall 50, and a carton squaring corner abutment 52 disposed on the upper portion of the free end of the rear wall 48. The corner abutment 52 includes a vertical surface which is disposed at 45° relative to the vertical carton engaging plane of the rear wall 48 and is arranged to engage one upstanding edge of the carton.

Each carrier body 44 has one of the gates 26 pivotally connected thereto by means of a pivot pin 55 which extends through ears 56 and 57 formed in the body 44 and through a tongue 58 of the gate 26. The pivot pin 55 is locked in position by a screw 59 (FIG. 6) which is screwed into the ear 56. Each gate 26 also includes an upstanding front or gate wall 60 which is integral with the tongue and with an actuating arm 62, which arm 62 extends rearwardly adjacent the side wall 50. The arm has a trip pin 64 on its rear end which projects transversely outward therefrom. The upstanding wall of the gate 26 is relieved at 65 (FIGS. 10 and 11) adjacent its lower edge so as to apply its gripping force against the carton at a point above its sealed bottom closure. Also, the carton contacting surface of the gate wall 60 includes two planar surfaces 60a and 60b. The surface 60a is vertical when the gate is closed and engages the forward carton wall adjacent the carrier side wall 50 with equal force through its entire height, while the engaged portion of the carton wall away from the carrier wall 50 is subjected to a greater gripping force at its upper portion thereby aiding in squaring the carton. It will be obvious that the surfaces 60a and 60b intersect at 60c.

Figures 5, 6:
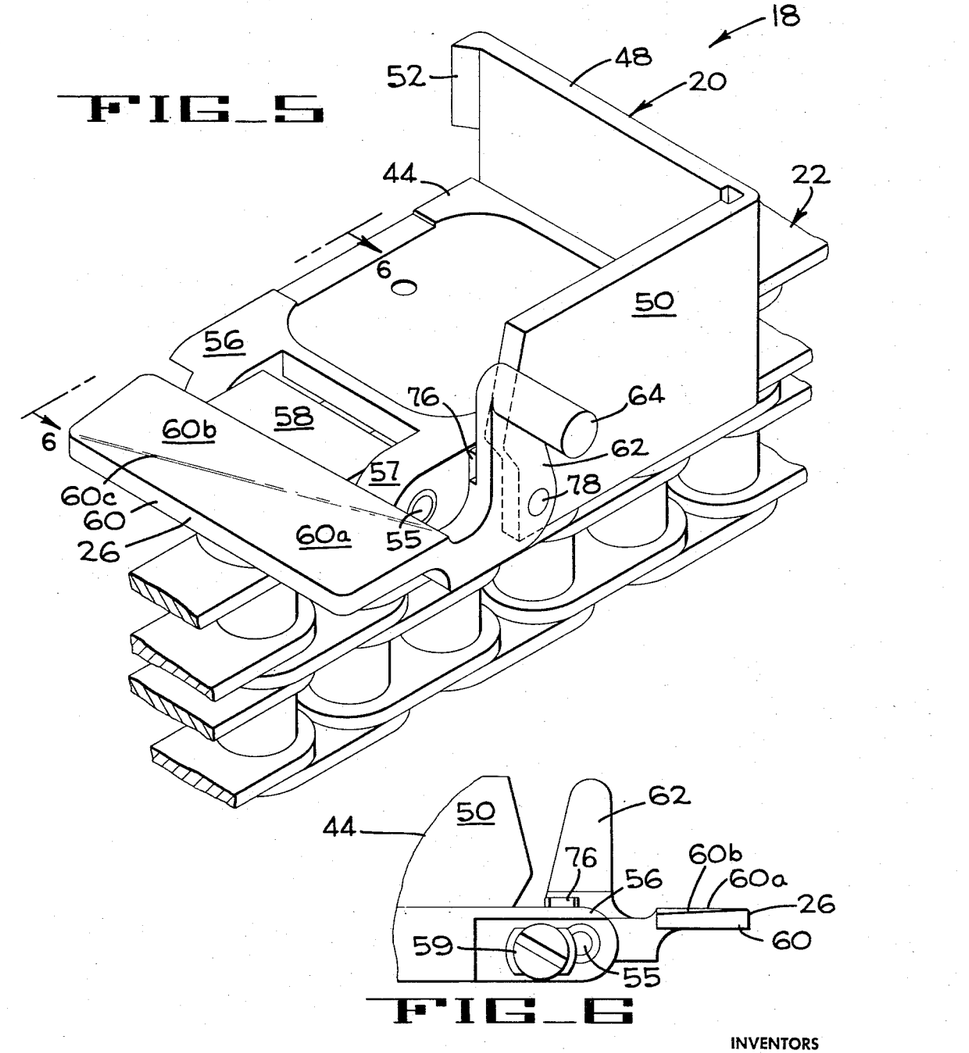
FIGURE 5 is a perspective of one of the carriers with the pivotal gate being opened.
FIGURE 6 is an elevation of a portion of the carrier taken looking in the direction of arrows 6—6 of FIGURE 5.
Figure 7:
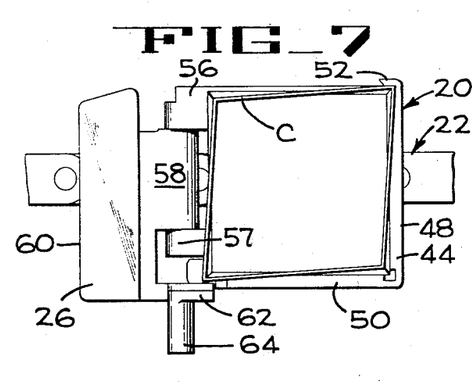
FIGURE 7 is a plan of one of the carriers with the gate being open and with a carton in position to be clamped in the carrier, the top closure of the carton being illustrated in the diamond-shaped configuration.
Figure 8:
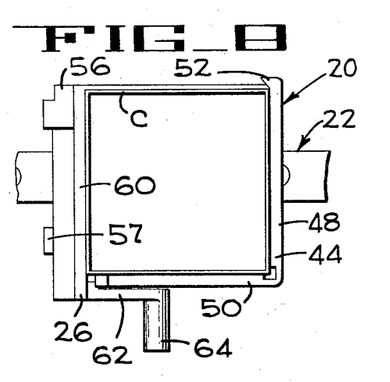
FIGURE 8 is a plan of a carrier with the gate closed and the carton therein maintained in squared position.
Figures 9, 10, 11:
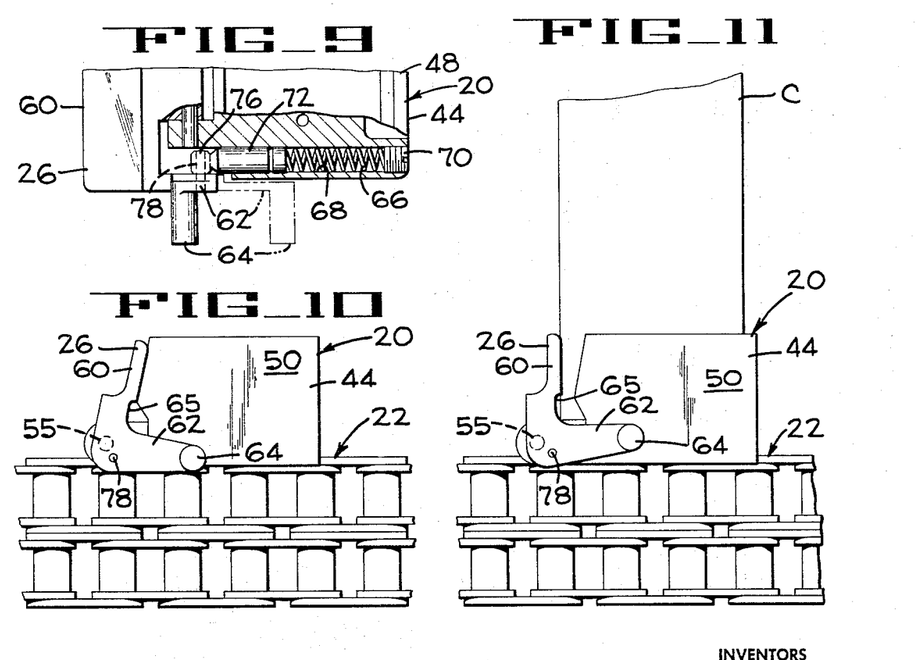
FIGURE 9 is a plan of a fragment of the carrier with parts broken away to illustrate resilient means for maintaining the gate in adjusted position.
FIGURE 10 is a side elevation of one of the carriers showing the gate in the empty carrier position.
FIGURE 11 is an elevation similar to FIGURE 10 but with the gate closed with a carton clamped therein.

The gate 26 is arranged to assume three separate positions; an open position with the front wall 60 horizontal and the trip pin 64 in an elevated position as indicated in FIGURE 5, a carton gripping and squaring position with the front wall substantially vertical and the trip pin at an intermediate elevation as indicated in FIGURE 11, and an empty carrier position with the front wall angled rearwardly and the trip pin at a lowermost position, as indicated in FIGURE 10. The gate 26 is held in the above position by a spring 66 (FIG. 9) which is received in a bore 68 in the body 44 and has one end thereof abutting a screw 70 screwed into the bore and has its other end abutting one end of an overcenter lock plunger 72. The other end of the over-center lock plunger 72 abuts a block 76 that is pivoted on a pin 78 secured to the actuating arm 62 at a point which is eccentric relative to the pivot bolt 55. The spring is of sufficient strength to maintain the gate 26 in adjusted position and to apply sufficient force to firmly grip a carton in the carrier.

An important feature of the invention is that the front wall 60 and its surfaces 60a and 60b cooperates with the corner abutment 52 to square the upper end of the carton, which upper end would otherwise assume a diamond-shaped configuration due to the resilience in the carton body which tends to return the carton body to a flat-folded condition.

Figure 3:
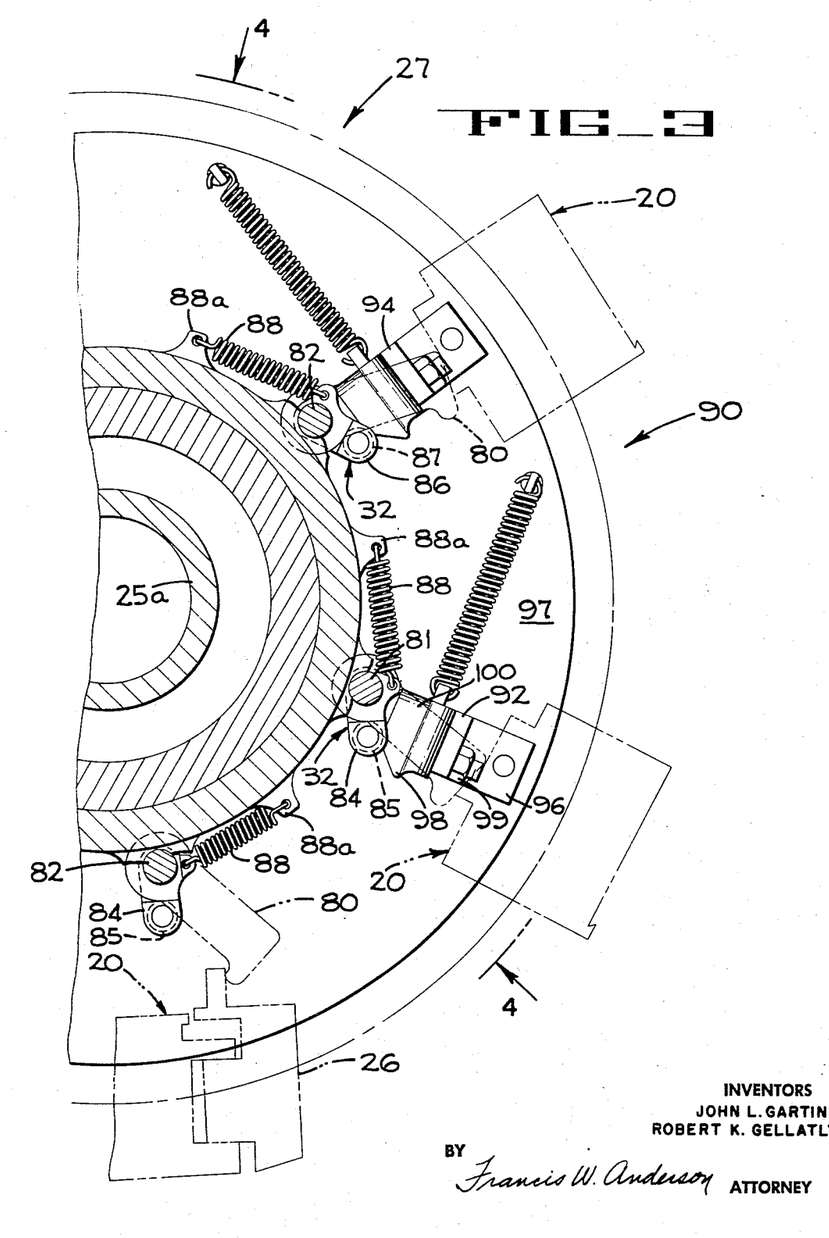
FIGURE 3 is an enlarged horizontal section taken along lines 3—3 of FIGURE 2 illustrating the carrier closing mechanism, certain parts being removed and others illustrated in phantom.
Figure 4:
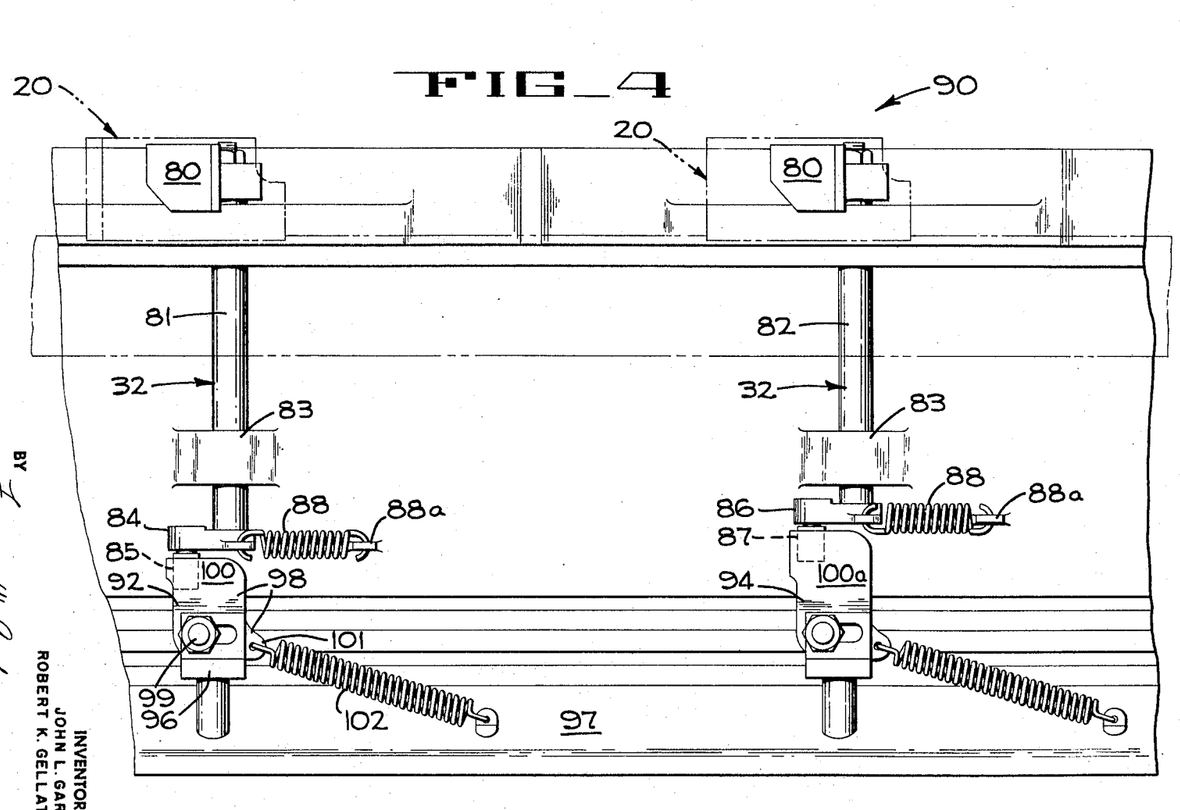
FIGURE 4 is a vertical arcuate section taken along lines 4—4 of FIGURE 3, showing the carriers in phantom.

As the conveyor 22 begins moving each empty carrier 20 around the forming turret 27 (FIG. 1) each carrier gate 26 is open, and accordingly, the trip pin 64 is in its uppermost position. The trip pin 64 of each gate 26 is disposed immediately adjacent the free end of an associated one of a plurality of gate actuating arms 80 of the gate closing mechanism 32. Each arm 80 is rigidly secured as by bolting to the upper end of either a long pivot shaft 81 (FIGS. 1 and 4) or a short pivot shaft 82, each of the pivot shafts being received in a pair of spaced ears 83 secured to and projecting outwardly from the drive hub 25. The shafts 81 and 82 are evenly spaced around the turret 27, and each long shaft 81 is interposed between a pair of short shafts 82 with the long shaft projecting downwardly a greater distance than the short shaft. A cam arm 84 having a roller 85 on its free end, is bolted to the lower end of each long shaft 81 and projects outwardly therefrom, and a similar cam arms 86, having a roller 87 on its free end, is bolted to the lower end of each short shaft and projects outwardly therefrom. As best shown in FIGURES 3 and 4, a plurality of tension springs 88 are provided, and each spring is secured between an associated cam arm and one of a plurality of ears 88a rigid with the drive hub 25 so as to normally urge the gate actuating arms 80 in a counterclockwise direction (FIG. 1) against adjustable stop bolts 89 secured to the drive hub 25.

When a pair of empty carriers 20 enters a carton receiving station 90, the associated cam arm 86 and roller 87 (FIGS. 3 and 4) on the short shaft 82 moves above and past a first or short trip device 92 without contacting the same and approaches a tall or second trip device 94. The trip device 92 comprises a bracket 96 bolted to a stationary annular support 97 to which a bell crank 98 is pivotally attached by a shouldered bolt 99. The bell crank includes a short upstanding trip arm 100 and a spring attachment arm 101 to which one end of the spring 102 is connected. The other end of the spring 102 is connected to the annular support 97 and normally holds the trip finger 100 in a vertical position. The spring 102 is provided so as to permit the finger 100 to pivot downwardly in a counterclockwise direction (FIG. 4) in the event the direction of movement of the conveyor 22 is reversed, during adjustment or maintenance of the machine, thus permitting the cam arm 84 and roller 85 to move therepast without injury to the gate closing mechanisms 32 or to the trip device 92.

The second trip device 94 is identical to the first trip device 92 except that the trip finger 100a of the second device is longer than the finger 100. The trip devices 92 and 94 are spaced apart a distance which will cause the cam arm roller 87 to engage the trip arm 100a simultaneously as the cam arm roller 85 engages the trip arm 100. Thus, the carrier trip pins 64 (FIG. 1) of both gates 26 of the two carriers at the carton receiving station 90, will be engaged at the same time thereby closing both gates simultaneously whether or not each carrier is filled with a carton.

It will be understood that the first trip device 92 and the second trip device 94 are positioned relative to the forming turret 27 and transfer turrets 28 and 30 so that two cartons are simultaneously fed into the two carriers at the carton receiving station 90 and shortly thereafter the two gates are simultaneously closed to grip said two cartons as mentioned above.

The forming turret 27, transfer turrets 28 and 30, and their cooperative relationship with the carriers 20 are fully disclosed and claimed in the above referred to copending Gartin application, and reference may be had to said application if a more detailed description of these turrets is desired.

After the cartons have been filled and sealed, they are discharged from the carriers 20 by a gate opening mechanism 110, (FIGS. 12 and 13) which is associated with the discharge conveyor 34.

Figure 12:
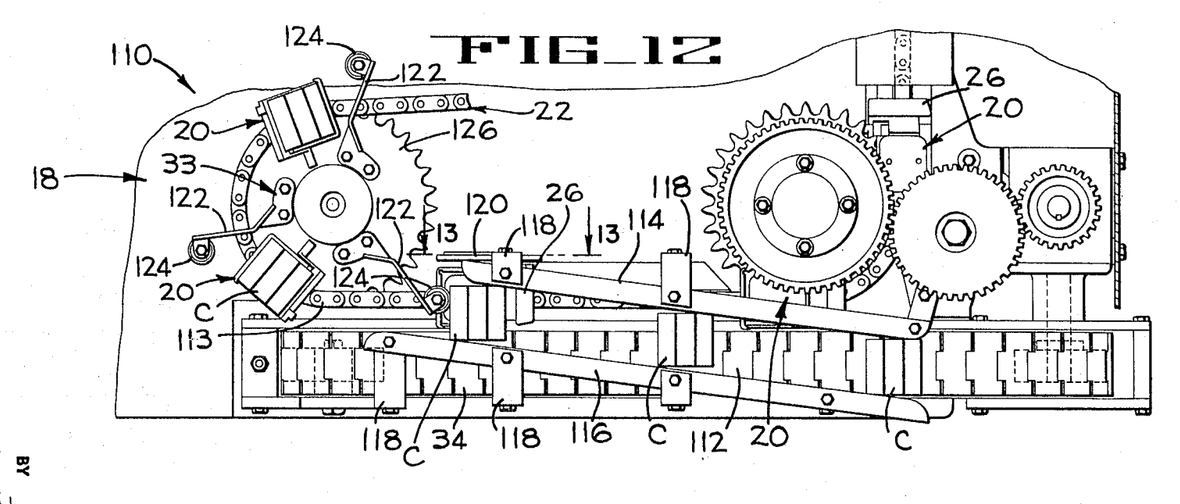
FIGURE 12 is a plan view illustrating a gate opening and carton discharging mechanism which mechanism opens the carriers and discharges the filled and sealed cartons from the carriers.
Figure 13:
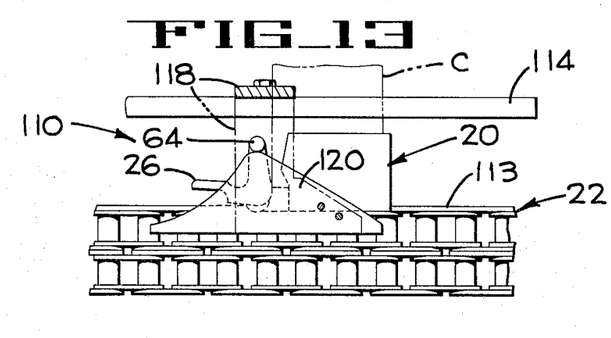
FIGURE 13 is an enlarged vertical section taken along lines 13—13 of FIGURE 12.

The gate opening and carton discharging mechanism 110 is associated with the discharge conveyor 34 which includes as upper run 112 moving at substantially the same speed and in the same direction as a linear discharge run 113 of the conveyor 22 and disposed at substantially the same elevation as the carton supporting floor of each carrier 20. A pair of spaced parallel guide rods 114 and 116 are mounted above conveyors 22 and 34 and have their carton receiving inlet end disposed over the conveyor 22 in position to slidably engage and deflect the cartons from their carriers, and have their outlet end disposed above and in vertical alignment with the upper run 112 of the discharge conveyor 34. The rods 114 and 116 are connected to brackets 118 which are secured to the frame of the machine.

The gate opening and carton discharging mechanism 110 includes a triangular cam 120 (FIG. 13) which is secured to one of the brackets 118 at a point immediately adjacent the inlet end of the guide rods 114 and 116. The triangular cam 120 engages the trip pin 64 of the carrier gate 26 thereby opening the gate 26 as the carton enters the inlet end of the rods 114 and 116.

In order to assist the guide rods 114 and 116 in moving the cartons from the carriers 20 after the gates 26 have been opened, three equally spaced carton deflecting fingers 122 (FIG. 12) having carton engaging rollers 124 journaled on the free end thereof are bolted to an idler sprocket 126. The idler sprocket 126 is journaled immediately adjacent the inlet end of the guide rods 114 and 116 and has the conveyor 22 trained therearound. The rollers 124 are positioned relative to the cartons and carriers 20 so as to closely follow the cartons until the cartons and carriers move tangentially away from the sprocket 126 between the guide rods 114 and 116. The rollers 124 then engage the rear surfaces of the cartons and push them slightly forward unlocking the carton from the edge 52 and thereby aiding in transferring the cartons from the carriers 20 onto the discharge conveyor 34.

From the foregoing description it is apparent that the carton transporting mechanism of the present invention comprises carriers having gates thereon, apparatus for closing and opening the gates and means for assisting the discharge of articles from the carriers. Each gate includes a gate actuator trip pin that is selectively movable into an open position, a carton gripping and squaring position, and an empty carrier position. The carriers not only firmly clamp the cartons therein but also maintain the upper ends thereof in a squared condition. An improved gate opening and carton discharging mechanism is also provided for effecting the reliable discharge of cartons from the carriers.

While one embodiment of the present invention has been shown and described, it will be understood that changes and modifications may be made therein without departing from the spirit of the invention or the scope of the appended claims.

The present invention and the manner in which the same is to be used having thus been described, what is claimed as new and desired to be protected by Letters Patent is:

1. A carton transporting mechanism comprising a continuously driven endless transport conveyor, a carrier body on said conveyor, a first and a second upstanding wall on said carrier body, said walls being normal to each other, means defining a corner abutment secured to a vertical edge of said first wall and having a carton engaging surface defining an obtuse angle with said first wall, a gate pivotally mounted on said carrier body about a pivot axis parallel to said first wall and being selectively movable between an open position permitting a carton to enter said carrier body and an upstanding closed position opposite said first wall, resilient means operatively connected between said gate and said carrier body for holding said gate in either selected position, and means for opening and closing said gate.

2. An apparatus according to claim 1 wherein the carton is of rectangular cross-section and has a lower closed end and an upper open end which tends to assume a diamond-shaped configuration when the carton is unsupported, said corner abutment means being secured to said vertical edge of said first wall adjacent the upper end thereof, and said resilient means being of sufficient strength to urge said gate into clamping engagement with a portion of the carton that is opposed to said corner abutment means with sufficient force to maintain the upper open end of the carton in a rectangular configuraion.

3. An apparatus according to claim 1 and additionally comprising a pin eccentrically secured to said gate relative to said pivot axis, a block pivoted on said pin, means defining an elongated bore in said carrier body, an over-center lock plunger slidably received in one end of said bore and having one end engaging said block, abutment means secured to and blocking the other end of said bore, and said resilient means being disposed between said abutment means and said plunger for applying resilient pressure to said pin.

4. An apparatus according to claim 1 wherein said gate has an actuating arm secured thereto and projecting rearwardly toward said first wall and outwardly of said second wall, a trip pin secured to the free end of said actuating arm and adapted to be selectively disposed at a plurality of separate elevations, first cam means at a point along the path of movement of said conveyor for engaging said trip pin when at a first elevation and pivoting said gate from an open to a closed carton gripping position with said trip pin at a second elevation when a carton is present in said carrier body, and second cam means disposed at another position along said conveyor for engaging said trip pin and moving said gate from the closed to open position.

5. An apparatus according to claim 4 wherein said trip pin assumes another elevation when said gate is closed and a carton is not present in said carrier body.

6. An apparatus according to claim 2 wherein said gate has an actuating arm secured thereto and projecting rearwardly toward said first wall and outwardly of said second wall, a trip pin secured to the free end of said actuating arm, first cam means at one point along the path of movement of said conveyor for engaging said trip pin and pivoting said gate from an open to a closed carton gripping position with said trip pin at a predetermined elevation when a carton is present in said carrier body and at a different elevation when a carton is absent from the carrier, and second cam means disposed at another position along said conveyor for engaging said trip pin and moving said gate from the closed to the open position.

7. An apparatus according to claim 4 wherein said second cam means is included in a gate opening and carton discharging mechanism, and wherein said mechanism additionally comprises a discharge conveyor having an upper run disposed at the same level as the carton supporting surface of said carrier body, said transport conveyor having a linear run disposed parallel to and closely adjacent said discharge conveyor, and a pair of spaced guide rods defining a carton guiding track angled obliquely relative to said conveyors and having an inlet end over said linear run of the transport conveyor and a discharge end over said discharge conveyor, said guide rods arranged to engage the carton and slide the carton out of the carrier and onto said discharge conveyor.

8. An apparatus according to claim 7 and additionally comprising an idler sprocket disposed adjacent said inlet end of said track and having said transport conveyor trained therearound, and displacement means carried by said sprocket for engaging the carton and pushing said carton away from said first wall as the carton enters said inlet end.

9. An apparatus according to claim 8 wherein said displacement means comprises an arm secured to said idler sprocket and extending outwardly therefrom, and a roller journaled on said arm and disposed in position to engage the carton when the trasport conveyor is moved tangentially away from the idler sprocket.

10. An apparatus according to claim 6 wherein said first cam means is arranged to close the gates of two adjacent carriers simultaneously, and wherein said second cam means opens one gate at a time.

References Cited

UNITED STATES PATENTS

| | | | |
|---|---|---|---|
| 733,460 | 7/1903 | Cormack | 198—179 |
| 2,443,293 | 6/1948 | Bergstein et al. | 198—179 |
| 2,667,958 | 2/1954 | Malhiot | 198—179 XR |

HUGO O. SCHULZ, *Primary Examiner.*

R. J. HICKEY, *Assistant Examiner.*